United States Patent
Sambuichi et al.

(10) Patent No.: US 12,027,949 B2
(45) Date of Patent: Jul. 2, 2024

(54) MOTOR AND ASSEMBLY METHOD THEREFOR

(71) Applicant: NIDEC CORPORATION, Kyoto (JP)

(72) Inventors: Hiroshi Sambuichi, Kyoto (JP); Desen Pan, Liaoning (CN); Wenxian Shi, Liaoning (CN)

(73) Assignee: NIDEC CORPORATION, Kyoto (JP)

( * ) Notice: Subject to any disclaimer, the term of this patent is extended or adjusted under 35 U.S.C. 154(b) by 311 days.

(21) Appl. No.: 17/706,576

(22) Filed: Mar. 28, 2022

(65) Prior Publication Data

US 2022/0320950 A1    Oct. 6, 2022

(30) Foreign Application Priority Data

Mar. 31, 2021    (CN) .......................... 202110346462.9

(51) Int. Cl.
*H02K 5/22*    (2006.01)
*H02K 15/02*   (2006.01)

(52) U.S. Cl.
CPC ............ *H02K 5/225* (2013.01); *H02K 15/02* (2013.01); *H02K 2203/09* (2013.01)

(58) Field of Classification Search
CPC .... H02K 5/225; H02K 15/02; H02K 2203/09; H02K 5/10
See application file for complete search history.

(56) References Cited

U.S. PATENT DOCUMENTS

| 10,855,130 | B2  | 12/2020 | Kim | |
|---|---|---|---|---|
| 11,677,288 | B2  | 6/2023 | Kim | |
| 2015/0162798 | A1* | 6/2015 | Ozawa | H02K 5/22 310/43 |
| 2018/0123414 | A1* | 5/2018 | Kim | H02K 3/18 |

FOREIGN PATENT DOCUMENTS

| JP | WO2013069685 | 4/2015 |
|---|---|---|
| KR | 1020160123143 | 10/2016 |

* cited by examiner

*Primary Examiner* — Tulsidas C Patel
*Assistant Examiner* — Mohammed Ahmed Qureshi
(74) *Attorney, Agent, or Firm* — JCIPRNET

(57) ABSTRACT

The disclosure provides a motor and a method for assembling the motor. The motor includes: a bus bar including a first portion of the bus bar and a second portion of the bus bar, the first portion of the bus bar and the second portion of the bus bar are defined separately; a first support component having a first support surface supporting the first abutting portion of the first portion of the bus bar toward the first direction; and a second support component having a second support surface supporting the second abutting portion of the second portion of the bus bar toward the first direction. The first portion of the bus bar further includes a first connecting portion, and the second portion of the bus bar further includes a second connecting portion. A distance between the first connecting portion and the second connecting portion is variable in the first direction.

10 Claims, 3 Drawing Sheets

MOTOR AND ASSEMBLY METHOD THEREFOR

CROSS REFERENCE TO RELATED APPLICATIONS

The present invention claims priority under 35 U.S.C. § 119 to Chinese Application No. 202110346462.9 filed on Mar. 31, 2021 the entire content of which is incorporated herein by reference.

FIELD OF THE INVENTION

The present disclosure relates to the field of motors, and in particular, to a motor and a method for assembling the motor.

BACKGROUND

In the related art, when power is supplied to a motor, it is sometimes necessary to electrically connect the internal portions of the motor to the external power supply using a bus bar. For example, one end of the bus bar is engaged with a connection terminal of an internal portion of the motor, and the other end of the bus bar is connected to an external power supply.

It should be noted that the above description of the technical background is only for the convenience of clearly and completely describing the technical solutions of the present disclosure, and for facilitating the understanding of those skilled in the art. It should not be assumed that the above-mentioned technical solutions are commonly known to those skilled in the art simply because these solutions are described in the background section of the present disclosure.

The inventors found that when the bus bar has a multi-segment bending structure, the bus bar may be positioned by using the abutting surface in the motor. For example, a first abutting surface is used to position the first bent portion of the bus bar in the axial direction, and a second abutting surface is used to position the second bent portion of the bus bar in the axial positioning. During the manufacturing process of the motor, it cannot be guaranteed that the distance between the first abutting surface and the second abutting surface is exactly the same as the distance between the first bent portion and the second bent portion of the bus bar. In the case of abutting the first bent portion of the bus bar with the first abutting surface, it cannot be guaranteed that the second bent portion of the bus bar and the second abutting surface are reliably abutted together, that is, to provide reliable support for the bus bar. As a result, when the other end of the bus bar is connected to an external power supply, the bus bar tends to move in the axial direction.

SUMMARY

According to a first aspect of the embodiments of the present disclosure, there is provided a motor. The motor includes a bus bar including a first portion of the bus bar and a second portion of the bus bar, and the first portion of the bus bar and the second portion of the bus bar are separately defined; a first support component having a first support surface that supports a first abutting portion of the first portion of the bus bar toward a first direction; and a second support component having a second support surface that supports a second abutting portion of the second portion of the bus bar toward the first direction, and the second support surface is located on one side of the first support surface in the first direction. The first portion of the bus bar further includes a first connecting portion, and the second portion of the bus bar further includes a second connecting portion. The first connecting portion is electrically connected with the second connecting portion, and a distance between the first connecting portion and the second connecting portion is variable in the first direction.

According to a second aspect of the embodiments of the present disclosure, there is provided a method for assembling a motor. The motor includes a bus bar, a first support component and a second support component. The bus bar includes a first portion of the bus bar and a second portion of the bus bar that are defined separately. The method includes: abutting the first abutting portion of the first portion of the bus bar on the first support surface of the first support component, so that the first support surface supports the first abutting portion toward the first direction; and abutting the second abutting portion of the second portion of the bus bar on the second support surface of the second support component, so that the second support surface supports the second abutting portion toward the first direction. The first connecting portion of the first portion of the bus bar is electrically connected with the second connecting portion of the second portion of the bus bar, and a distance between the first connecting portion and the second connecting portion is variable in the first direction.

The above and other elements, features, steps, characteristics and advantages of the present disclosure will become more apparent from the following detailed description of the preferred embodiments with reference to the attached drawings.

Features described and/or illustrated for one embodiment may be used in the same or similar manner in one or more other embodiments, combined with features in other embodiments, or replace features in other embodiments.

BRIEF DESCRIPTION OF THE DRAWINGS

The accompanying drawings, which are included to facilitate further understanding of the embodiments of the disclosure, constitute a part of the specification, are used to illustrate embodiments of the disclosure, and together with the written description, serve to explain the principles of the disclosure. Clearly, the drawings in the following description only illustrate some embodiments of the present disclosure, and for those of ordinary skill in the art, other drawings can also be obtained from these drawings without inventive effort. In the drawings.

DESCRIPTION OF THE EMBODIMENTS

Figure 1:
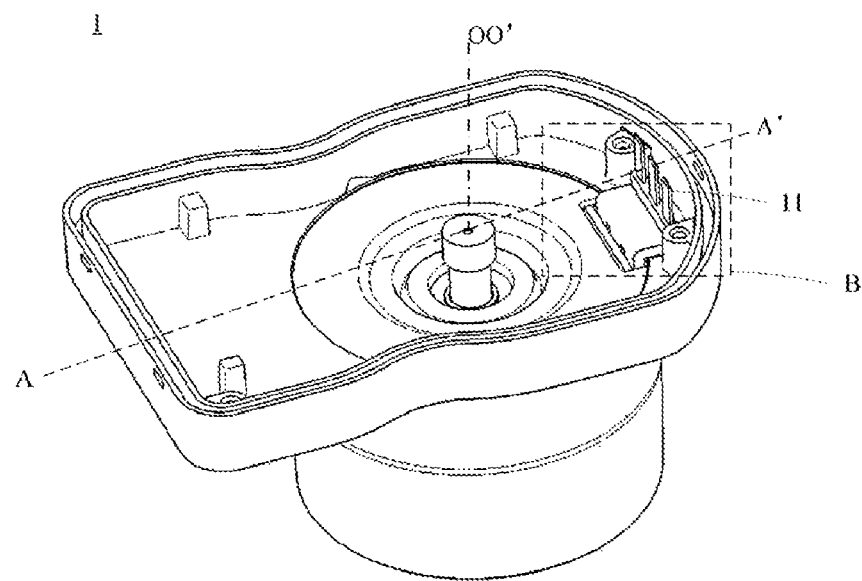
FIG. 1 is a schematic diagram of a motor according to a first embodiment of the present disclosure.

The foregoing and other features of the present disclosure will become clear from the following description with reference to the accompanying drawings. In the specification and drawings, exemplary embodiments of the disclosure are disclosed in detail, showing some embodiments in which the principles of the disclosure may be employed. It may be understood that the disclosure is not limited to the described embodiments, but rather the disclosure includes all modifications, variations and equivalents falling within the scope of the appended claims.

In addition, in each of the drawings used in the following description, since each structural component has a size that can be recognized on the drawing, the scale is different for each structural component, and the present disclosure is not limited to the number of structural components, the shape of the structural components, the ratio of the size of the structural components, and the relative positional relationship of the structural components.

In the embodiments of the present disclosure, the terms "first", "second", etc. are used to distinguish different components, but do not indicate the spatial arrangement or temporal order of these components, and these components should not be limited by the terminologies. The term "and/or" includes any and all combinations of one or more of the associated listed items. The terms "comprising", "including", "having", etc. refer to the presence of described features, components, elements or assemblies, but do not exclude the presence or addition of one or more other features, components, elements or assemblies.

In the embodiments of the present disclosure, the singular forms "a", "the", etc. include plural forms, and should be broadly understood as "one kind of" or "one type of" rather than being limited to the meaning of "one". In addition, the term "the" is understood to include both the singular and the plural meanings, unless the context clearly dictates otherwise. Furthermore, the term "according to" should be understood as "at least in part according to . . . " and the term "based on" should be understood as "based at least in part on . . . " unless the context clearly dictates otherwise.

In the embodiments of the present disclosure, a direction that is parallel to the direction extending along the central axis is referred to as "axial direction", a radial direction using the central axis as the center is referred to as "radial direction", and a direction surrounding the central axis is referred to as "circumferential direction". It should be noted that the definitions of the various directions in this specification are only for the convenience of describing the embodiments of the present disclosure, and do not limit the directions of the motor and the like during use and manufacture.

Figure 2:
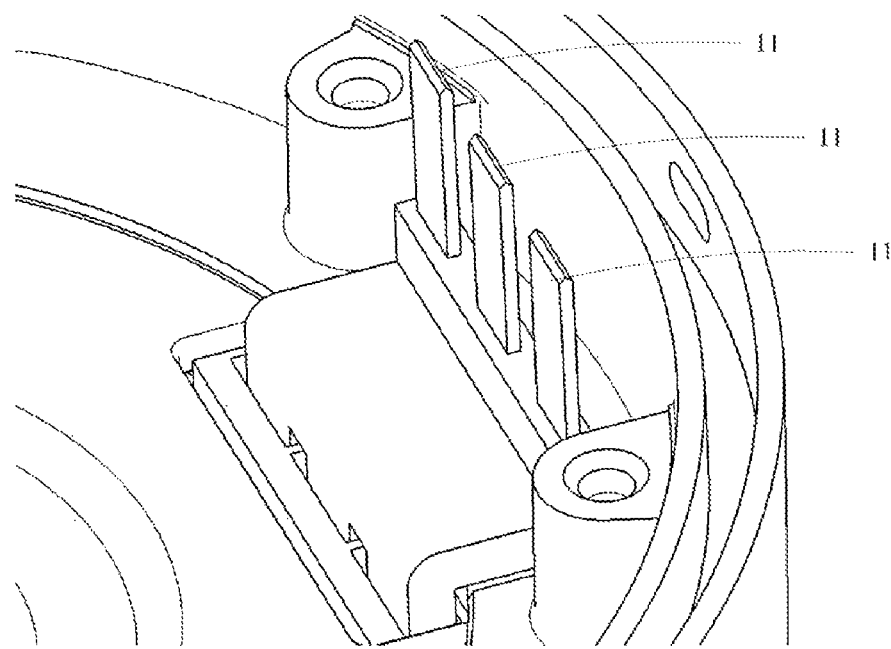
FIG. 2 is a schematic diagram of partial enlargement of the motor according to the first embodiment of the present disclosure.
Figure 3:
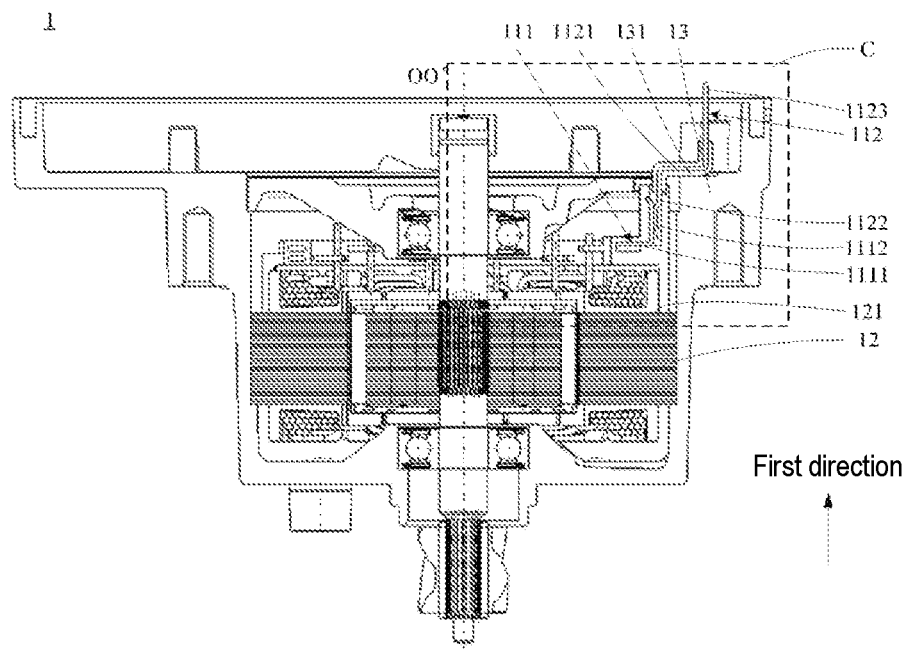
FIG. 3 is a cross-sectional diagram of the motor according to the first embodiment of the present disclosure.
Figure 4:
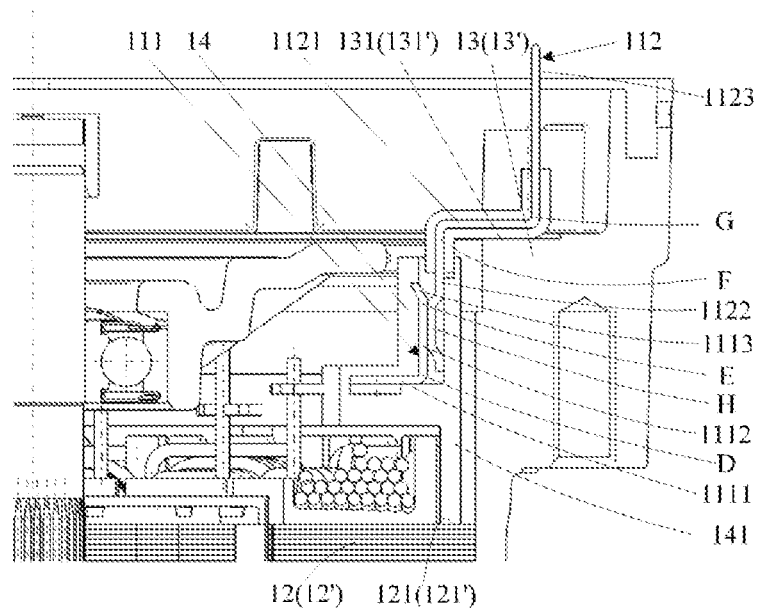
FIG. 4 is a cross-sectional diagram of partial enlargement of the motor according to the first embodiment of the present disclosure.

A first embodiment of the present disclosure provides a motor. FIG. 1 is a schematic diagram of a motor according to a first embodiment of the present disclosure. FIG. 2 is a schematic diagram of partial enlargement of the motor 1 according to the first embodiment of the present disclosure, which shows the range corresponding to the dashed box B in FIG. 1. FIG. 3 is a cross-sectional diagram of the motor 1 according to the first embodiment of the present disclosure. FIG. 3 shows a cross-sectional view along section line AA' in FIG. 1. FIG. 4 is a cross-sectional diagram of partial enlargement of the motor 1 according to the first embodiment of the present disclosure, which shows the range corresponding to the dashed box C in FIG. 3.

In at least one embodiment, as shown in FIG. 1 and FIG. 3, the motor 1 includes a bus bar 11, a first support component 12 (shown in FIG. 3) and a second support component 13 (shown in FIG. 3).

The bus bar 11 includes a first portion 111 of the bus bar and a second portion 112 of the bus bar. The first portion 111 of the bus bar and the second portion 112 of the bus bar are defined separately.

The first support component 12 has a first support surface 121. The first support surface 121 supports the first abutting portion 1111 of the first portion 111 of the bus bar toward the first direction (as shown in FIG. 3).

The second support component 13 has a second support surface 131. The second support surface 131 supports the second abutting portion 1121 of the second portion 112 of the bus bar toward the first direction. The second support surface 131 is located on one side of the first support surface 121 in the first direction.

The first portion 111 of the bus bar further includes a first connecting portion 1112, and the second portion 112 of the bus bar further includes a second connecting portion 1122. The first connecting portion 1112 is electrically connected with the second connecting portion 1122, and a distance between the first connecting portion 1112 and the second connecting portion 1122 is variable in the first direction.

According to the above-described embodiment, by forming the bus bar 11 as a separate structure, and with the variable distance between the first connecting portion 1112 of the first portion 111 of the bus bar and the second connecting portion 1122 of the second portion 112 of the bus bar in the first direction, the bus bar 11 is able to be supported and positioned reliably.

In at least one embodiment, the motor 1 may be any type of motor, which is not specifically limited in this disclosure.

In at least one embodiment, the motor 1 may include one or more bus bars 11. For example, as shown in FIG. 2, the motor 1 may include three bus bars 11.

In at least one embodiment, the bus bar 11 may include two portions that are defined separately. For example, as shown in FIG. 3, the bus bar 11 may include the first portion 111 of the bus bar and the second portion 112 of the bus bar that are defined separately. However, the present disclosure is not limited thereto, and the bus bar 11 may also include three or more portions that are defined separately, so that the bus bar 11 is able to be applied to more scenarios.

In at least one embodiment, as shown in FIG. 3, the second portion 112 of the bus bar may further include an insertion portion 1123. The insertion portion 1123 is electrically connected to an external power supply of the motor 1 and is located on one side (like the upper side as shown in FIG. 3) of the second support surface 131 in the first direction.

In at least one embodiment, the insertion portion 1123 of the bus bar 11 may be in any form that is able to be electrically connected to an external power supply. For example, as shown in FIG. 2, the insertion portion 1123 is plate-shaped or substantially plate-shaped.

In at least one embodiment, as shown in FIG. 3, the first abutting portion 1111 of the first portion 111 of the bus bar may abut against the first support surface 121, and the first support surface 121 supports the first abutting portion 1111 toward the first direction. For example, the first support surface 121 may be a surface perpendicular to the first direction, which is able to apply a supporting force in the first direction to the first abutting portion 1111. In another example, the first support surface 121 may also be a surface that forms a certain angle with the first direction, that is, the supporting force exerted by the first support surface 121 on the first abutting portion 1111 has a component force in the first direction, thereby supporting the first abutting portion 1111 toward the first direction.

In at least one embodiment, as shown in FIG. 3, the second abutting portion 1121 of the second portion 112 of the bus bar may abut against the second support surface 131, and the second support surface 131 supports the second abutting portion 1121 toward the first direction. For example, the second support surface 131 may be a surface perpendicular to the first direction, which is able to apply a supporting force in the first direction to the second abutting portion 1121. In another example, the second support surface 131 may also be a surface that forms a certain angle with the first direction, that is, the supporting force exerted by the second support surface 131 on the second abutting portion 1121 has a component force in the first direction, thereby supporting the second abutting portion 1121 toward the first direction.

In at least one embodiment, the first support surface 121 may be a surface parallel to the second support surface 131, however, the present application is not limited thereto, and the first support surface 121 may also be a surface forming a certain angle with the second support surface 131. In this manner, the support surface for supporting and positioning the bus bar 11 is able to be defined in the motor 1 more flexibly.

In at least one embodiment, as shown in FIG. 3, the first connecting portion 1112 of the first portion 111 of the bus bar and the second connecting portion 1122 of the second portion 112 of the bus bar may be electrically connected between the first support surface 121 and the second support surface 131. By disposing the first connecting portion 1112 and the second connecting portion 1122 between the first support surface 121 and the second support surface 131, the miniaturization of the motor 1 is able to be achieved, and the lengths of the first connecting portion 1112 and the second connecting portion 1122 are able to be shortened, so that the manufacturing process of the bus bar 11 is able to be simplified.

However, the present application is not limited thereto, and the first connecting portion 1112 and the second connecting portion 1122 may also be electrically connected with each other at one side (like the lower side of the first support surface 121 as shown in FIG. 3) of the first support surface 121 opposite from the first direction. Alternatively, the first connecting portion 1112 and the second connecting portion 1122 may also be electrically connected with each other on one side (like the upper side of the second support surface 131 as shown in FIG. 4) of the second support surface 131 in the first direction.

In at least one embodiment, the first connecting portion 1112 and the second connecting portion 1122 may be electrically connected by abutting against each other. The first connecting portion 1112 and the second connecting portion 1122 may abut against each other in any direction. For example, as shown in FIG. 3, the first connecting portion 1112 and the second connecting portion 1122 may abut against each other in a second direction perpendicular to the first direction; in another example, the first connecting portion 1112 and the second connecting portion 1122 may abut against each other in the first direction; in still another example, the first connecting portion 1112 and the second connecting portion 1122 may abut against each other in a direction forming a certain angle with the first direction.

In at least one embodiment, the first connecting portion 1112 and the second connecting portion 1122 may be elastically deformed structures in the second direction. For example, as shown in FIG. 3, the first connecting portion 1112 may overlap with the second connecting portion 1122 in the second direction, and both are electrically connected in a manner of generating elastic deformation in the second direction.

In at least one embodiment, the first connecting portion 1112 and the second connecting portion 1122 may be elastically deformed structures in the first direction. For example, the length of the first connecting portion 1112 is variable in the first direction. For example, the first connecting portion 1112 may include a first elastic component, which may be elastically deformed when being subjected to an external force; or, the length of the second connecting portion 1122 is variable in the first direction. For example, the second connecting portion 1122 may include a second elastic component that is able to be elastically deformed when being subjected to an external force; alternatively, the lengths of the first connecting portion 1112 and the second connecting portion 1122 are variable in the first direction.

In at least one embodiment, the first connecting portion 1112 and the second connecting portion 1122 may be elastically deformed structures in the first direction and the second direction.

In at least one embodiment, the distance between the first connecting portion 1112 and the second connecting portion 1122 is variable in the first direction, that is, the relative positions of the first connecting portion 1112 and the second connecting portion 1122 are variable in the first direction. For example, as shown in FIG. 3, in the case where the first connecting portion 1112 and the second connecting portion 1122 abut against each other in the second direction, the length of the portion where the first connecting portion 1112 and the second connecting portion 1122 overlap each other is variable. In another example, in the case where the first connecting portion 1112 and the second connecting portion 1122 abut against each other in the first direction, at least one of the first connecting portion 1112 and the second connecting portion 1122 is compressed compared to the case where the first connecting portion 1112 and the second connecting portion 1122 are not in abutment.

Since the distance between the first connecting portion 1112 and the second connecting portion 1122 is variable in the first direction, by adjusting the distance between the first connecting portion 1112 and the second connecting portion 1122 in the first direction, the bus bar 11 is able to be reliably supported by the first support surface 121 and the second support surface 131. In this manner, when the insertion portion 1123 of the bus bar 11 is connected to an external power supply, the bus bar 11 is able to be prevented from moving in the first direction.

In at least one embodiment, as shown in FIG. 4, the motor 1 may further include a fixing portion 14. The fixing portion 14 is at least partially located on the outer peripheral sides of the first connecting portion 1112 and the second connecting portion 1122. The inner peripheral surface of the fixing portion 14 abuts against the first connecting portion 1112 and/or the second connecting portion 1122. In this manner, the first connecting portion 1112 and the second connecting portion 1122 are able to be limited in position, so that the first connecting portion 1112 and the second connecting portion 1122 are electrically connected in a reliable manner.

In at least one embodiment, the fixing portion 14 may be a resin holding frame. However, the present disclosure is not limited thereto, and the fixing portion 14 may be other components.

In at least one embodiment, as shown in FIG. 4, the first abutting portion 1111 of the first portion 111 of the bus bar may abut against the first support surface 121 over the fixing portion 14. The second abutting portion 1121 of the second portion 112 of the bus bar may abut against the second support surface 131 over the fixing portion 14.

In at least one embodiment, as shown in FIG. 4, the fixing portion 14 may include a foot portion 141 supported on the first support surface 121, and the first abutting portion 1111 of the first portion 111 of the bus bar may abut against the first support portion 121 through the foot portion 141, for example, to abut against a surface 121' of one side (like the upper side as shown in FIG. 4) of the stator core 12' in the axial direction. In addition, the first connecting portion 1112 and the second connecting portion 1122 may be connected at one side of the foot portion 141 in the axial direction. In this manner, the foot portion 141 is able to provide reliable support when the first connecting portion 1112 and the second connecting portion 1122 are connected.

In at least one embodiment, the first direction may be a direction facing one side of the motor 1 in the axial direction. However, the present disclosure is not limited thereto, and the first direction may also be other directions. Hereinafter, the structure of the motor 1 will be described by taking the first direction, which is a direction facing one side of the motor 1 in the axial direction, as an example.

In at least one embodiment, as shown in FIG. 4, the first support component 12 is the stator core 12' of the motor 1, the first support surface 121 is a surface 121' on one side of the stator core in the axial direction, the second support component 13 is a housing 13' of the motor 1, and the second support surface 131 is a surface 131' on one side of the housing in the axial direction. However, the present disclosure is not limited thereto, and the first support component 12 and the second support component 13 may also be other components of the motor 1. For example, the first support component 12 and the second support component 13 may both be housings of the motor 1. The housing of the motor 1 is designed as a multi-level stepped structure, and the first portion 111 of the bus bar and the second portion 112 of the bus bar are respectively abutted by the stepped structure of the housing.

Hereinafter, in the following description of the structure of the motor 1, the first support component 12 is exemplified as the stator core 12' of the motor 1, the first support surface 121 is exemplified as the surface 121' on one side of the stator core in the axial direction, the second support component 13 is exemplified as the housing 13' of the motor 1, and the second support surface 131 is exemplified as the surface 131' on one side of the housing in the axil direction.

In at least one embodiment, the first abutting portion 1111 of the first portion 111 of the bus bar may be electrically connected to the coil windings of the stator core 12'. In this manner, the stator of the motor 1 is able to be supplied with power through the bus bar 11.

In at least one embodiment, the second abutting portion 1121 of the second portion 112 of the bus bar may abut against the housing 13' through the fixing portion 14. In this manner, electrical connection between the second portion 112 of the bus bar and the housing 13' is avoided.

In at least one embodiment, the first abutting portion 1111 extends from an end portion D on the other side of the first connecting portion 1112 in the axial direction toward a direction perpendicular to the axial direction, specifically extending toward the radially inner side.

In at least one embodiment, the first portion 111 of the bus bar may further include a first guide portion 1113, which extends from an end portion E on one side of the first connecting portion 1112 in the axial direction toward a direction away from the second portion 112 of the bus bar. In this manner, the first connecting portion 1112 and the second connecting portion 1122 are able to be conveniently defined. However, the present disclosure is not limited thereto, and a second guide portion may be defined in the second portion 112 of the bus bar.

In at least one embodiment, the second abutting portion 1121 extends from an end portion F on one side of the second connecting portion 1122 in the axial direction toward a direction perpendicular to the axial direction, specifically extending toward the radially outer side. In this manner, the second abutting portion 1121 is able to abut against the surface 131' of the housing 13'.

In at least one embodiment, the second abutting portion 1121 connects the end portion G on the other side of the insertion portion 1123 in the axial direction and the end portion F on one side of the second connecting portion 1122 in the axial direction. Furthermore, the second abutting portion 1121 and the insertion portion 1123 and the second connecting portion 1122 may be integrally defined components.

In at least one embodiment, the second connecting portion 1122 has a protrusion H protruding toward the first connecting portion 1112, and the protrusion H abuts against the first connecting portion 1112. However, the present disclosure is not limited thereto, and protrusion may also be defined on the first connecting portion 1112.

In at least one embodiment, as shown in FIG. 4, the number of protrusions H is one. However, the present disclosure is not limited thereto, and the number of protrusions H may be two or more. The portion of the second connecting portion 1122 between adjacent protrusions H may be thinner than other portions of the second portion 112 of the bus bar. In this manner, elastic deformation is more easily generated in the direction perpendicular to the axial direction.

Figure 5:
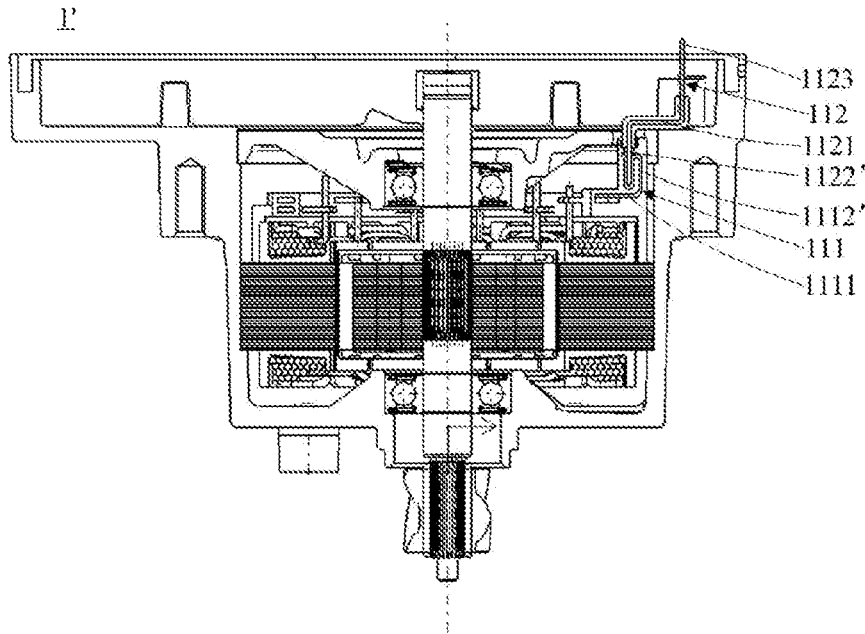
FIG. 5 is another cross-sectional diagram of the motor according to the first embodiment of the present disclosure.

FIG. 5 is another schematic view of the motor 1' according to the first embodiment of the present disclosure. The first connecting portion 1112' and the second connecting portion 1122' of the bus bar 11 in the motor 1' adopt different structures compared with the first connecting portion 1112 and the second connecting portion 1122 of the bus bar 11 shown in FIG. 3 and FIG. 4. Only the differences between the motor 1' and the motor 1 will be described below.

In at least one embodiment, as shown in FIG. 5, the first connecting portion 1112' has a U-shaped groove, and at least a portion (e.g., the end portion on the other side in the axial direction) of the second connecting portion 1122' is placed in the U-shaped groove, and abuts against the inner wall of the U-shaped groove. In this manner, the first connecting portion 1112' and the second connecting portion 1122' are electrically connected.

However, the present disclosure is not limited thereto, and a U-shaped groove may also be defined on the second connecting portion 1122', and at least a portion of the first connecting portion 1112' is placed in the U-shaped groove and abuts against the inner wall of the U-shaped groove.

In at least one embodiment, the distance between the inner walls of the U-shaped groove of the first connecting portion 1112' in the radial direction may be less than the thickness of the first connecting portion 1122' in the radial direction. In this manner, when the first connecting portion 1112' is placed in the U-shaped groove, the U-shaped groove is elastically deformed and clamps the first connecting portion 1122', thereby being able to reliably abut with the first connecting portion 1122'.

It should be noted that the above only describes the structure of the motor related to the present disclosure. For other structures of the motor, reference may be made to the related art, and the description is omitted here.

As can be obtained from the above-mentioned embodiments, the bus bar is able to be reliably supported and positioned by forming the bus bar as a separate structure.

This embodiment provides an electrical product, which includes the motor 1 or the motor 1' described in the first embodiment. Since the structure of the motor has been described in the first embodiment, the description of the motor is incorporated herein, and will not be repeated here.

With the electrical product of this embodiment, since the structure of the motor described in the first embodiment is adopted, the bus bar is able to be reliably supported and positioned by forming the bus bar as a separate structure.

In this embodiment, the electrical product may be any electrical product using the motor, for example, the electrical product may be an indoor unit as an air conditioner, an outdoor unit as an air conditioner, a water dispenser, a washing machine, a sweeper, a compressor, a blower, a mixer, and other home appliances. Alternatively, the product may be in-vehicle products using the motor, such as automobile electronic vacuum pumps, automobile brakes, automobile transmissions, etc. Alternatively, the product may be various information equipment and industrial equipment using the motor.

This embodiment provides a method for assembling a motor, assembling the motor 1 or the motor 1' described in the first embodiment. Specifically, the structure of the motor 1 or the motor 1' may be derived from the first embodiment, and the related description is incorporated herein and will not be repeated here.

Figure 6:
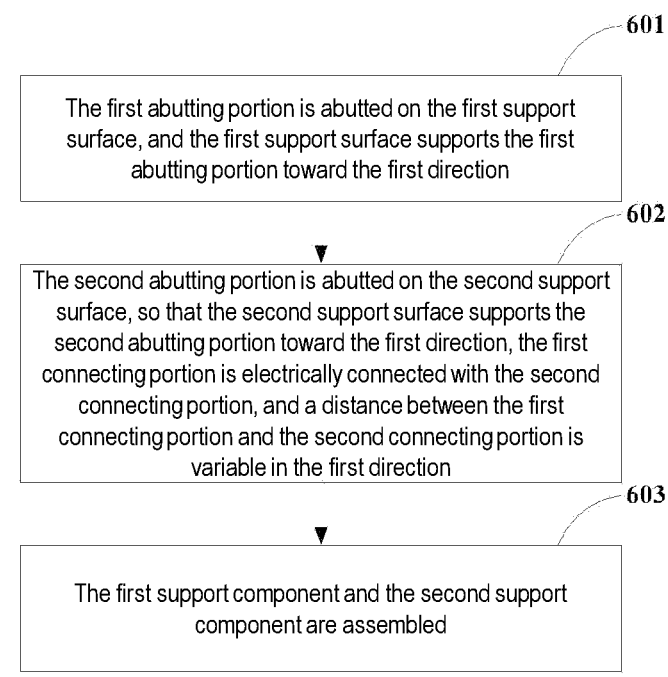
FIG. 6 is a flowchart of a method for assembling a motor according to a second embodiment of the present disclosure.

FIG. 6 is a flowchart of a method for assembling a motor according to a second embodiment of the present disclosure. In at least one embodiment, as shown in FIG. 6, the method of assembling the motor may include the following procedures:

Procedure 601: The first abutting portion of the first portion of the bus bar abuts against the first support surface of the first support component, and the first support surface supports the first abutting portion toward the first direction.

Procedure 602: The second abutting portion of the second portion of the bus bar abuts against the second support surface of the second support component, so that the second support surface supports the second abutting portion toward the first direction. The first connecting portion of the first portion of the bus bar is electrically connected with the second connecting portion of the second portion of the bus bar, and a distance between the first connecting portion and the second connecting portion is variable in the first direction.

According to the above-described embodiment, the bus bar is able to be reliably supported and positioned by abutting the first portion of the bus bar and the second portion of the bus bar separately defined on the first support surface and the second support surface, respectively.

In at least one embodiment, the method of assembling the motor may further include the following procedures:

Procedure 603: The first support component and the second support component are assembled.

Procedure 603 may be performed after procedure 601 and procedure 602, or may be before procedure 601 and procedure 602, which is not specifically limited in this disclosure.

It is worth noting that the above method may also include other procedures of assembling the motor. For other assembling procedures of the motor, reference may be made to the related art, and the description is omitted here.

According to the assembling method of the motor of the present embodiment, by abutting the first portion of the bus bar and the second portion of the bus bar separately defined on the first support surface and the second support surface, respectively, the bus bar is able to be reliably supported and positioned.

The present disclosure has been described above with reference to the exemplary embodiments, but those skilled in the art should understand that these descriptions are all exemplary and do not limit the scope to be protected by the present disclosure. Various variations and modifications of the present disclosure can be made by those skilled in the art in accordance with the spirit and principles of the present disclosure, and these variations and modifications also fall within the scope of the present disclosure.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor, comprising:
   a bus bar, comprising a first portion of the bus bar and a second portion of the bus bar, wherein the first portion of the bus bar and the second portion of the bus bar are defined separately;
   a first support component, having a first support surface that supports a first abutting portion of the first portion of the bus bar toward a first direction; and
   a second support component, which has a second support surface which supports a second abutting portion of the second portion of the bus bar toward the first direction, and the second support surface is located on one side of the first support surface in the first direction;
   wherein the first portion of the bus bar further comprises a first connecting portion, the second portion of the bus bar further comprises a second connecting portion, and the first connecting portion is electrically connected to the second connecting portion,
   a distance between the first connecting portion and the second connecting portion is variable in the first direction.

2. The motor according to claim 1, wherein the second portion of the bus bar further comprises:
   an insertion portion, which is electrically connected to an external power supply of the motor, and is located on one side of the second support surface in the first direction.

3. The motor according to claim 1, wherein
   the first connecting portion and the second connecting portion are electrically connected between the first support surface and the second support surface.

4. The motor according to claim 1, wherein
   the first support component is a stator core of the motor, the first support surface is a surface on one side of the stator core in an axial direction, the second support component is a housing of the motor, the second support surface is a surface on one side of the housing in the axial direction, and the first direction is a direction facing one side of the motor in the axial direction.

5. The motor according to claim 4, wherein the first abutting portion extends from an end portion on the other side of the first connecting portion in the axial direction toward a direction perpendicular to the axial direction.

6. The motor according to claim 4, wherein the second abutting portion extends from an end portion on one side of the second connecting portion in the axial direction toward a direction perpendicular to the axial direction.

7. The motor according to claim 1, wherein
the first connecting portion and the second connecting portion are structures that are elastically deformed in the first direction and/or in a second direction perpendicular to the first direction.

8. The motor according to claim 7, wherein
the first connecting portion and the second connecting portion overlap each other in the second direction, and the first connecting portion and the second connecting portion are electrically connected in a manner of elastic deformation in the second direction.

9. The motor according to claim 1, wherein the motor further comprises:
a fixing portion, at least a portion of which is located on an outer peripheral side of the first connecting portion and the second connecting portion, wherein an inner peripheral surface of the fixing portion abuts against the first connecting portion and/or the second connecting portion.

10. A method for assembling a motor, the motor comprising a bus bar, a first support component and a second support component, wherein the bus bar comprises a first portion of the bus bar and a second portion of the bus bar defined separately, and the method comprising:
abutting a first abutting portion of the first portion of the bus bar on a first support surface of the first support component, so that the first support surface supports the first abutting portion toward the first direction; and
abutting a second abutting portion of the second portion of the bus bar on a second support surface of the second support component, so that the second support surface supports the second abutting portion toward the first direction, wherein a first connecting portion of the first portion of the bus bar is electrically connected with a second connecting portion of the second portion of the bus bar, and a distance between the first connecting portion and the second connecting portion is variable in the first direction.

* * * * *